(12) United States Patent
Vroman et al.

(10) Patent No.: US 9,243,547 B2
(45) Date of Patent: Jan. 26, 2016

(54) DUAL INLET AND OUTLET EXHAUST GAS RECIRCULATION COOLER FOR TURBOCHARGED ENGINE

(71) Applicant: Ford Global Technologies, LLC, Dearborn, MI (US)

(72) Inventors: Dennis Vroman, Saint Clair Shores, MI (US); Freeman Carter Gates, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 14/180,280

(22) Filed: Feb. 13, 2014

(65) Prior Publication Data

US 2015/0226108 A1    Aug. 13, 2015

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F02B 29/04* | (2006.01) |
| *F02M 25/07* | (2006.01) |
| *F28F 9/02* | (2006.01) |

(52) U.S. Cl.
CPC ............ *F02B 29/0437* (2013.01); *F02M 25/07* (2013.01); *F28F 9/027* (2013.01)

(58) Field of Classification Search
CPC .. F02D 41/0007; F02B 29/0437; F02B 37/18; F02B 37/183; F02M 25/07; F02M 25/0709; F01N 5/02; F28F 9/027
USPC .......................... 60/287, 288, 320, 602, 605.2
See application file for complete search history.

(56) References Cited

U.S. PATENT DOCUMENTS

| | | | |
|---|---|---|---|
| 6,422,222 B1 * | 7/2002 | Arbeiter ................ | F01N 13/107 123/562 |
| 8,297,054 B2 | 10/2012 | Gladden et al. | |
| 2007/0028901 A1 * | 2/2007 | Watakabe .......... | F02M 25/0711 123/568.12 |
| 2012/0018127 A1 | 1/2012 | Iwasaki | |
| 2012/0023937 A1 | 2/2012 | Styles et al. | |
| 2012/0260650 A1 | 10/2012 | Luft et al. | |
| 2012/0279215 A1 | 11/2012 | Roth et al. | |

* cited by examiner

*Primary Examiner* — Audrey K Bradley
*Assistant Examiner* — Dapinder Singh
(74) *Attorney, Agent, or Firm* — Julia Voutyras; Alleman Hall McCoy Russell & Tuttle LLP

(57) ABSTRACT

Methods and systems are provided for a high-pressure exhaust gas recirculation (EGR) system of a parallel twin-turbocharged internal combustion engine. Using an EGR cooler with a single exhaust inlet and outlet to cool recirculated exhaust gas may increase the complexity and size of the engine package, along with adding unnecessary cost from extra ductwork to decrease the chance of turbocharger boost imbalance. To provide a way to reduce package size without affecting engine performance, an EGR cooler with two exhaust inlets and outlets is used to cool exhaust flows leading from two cylinder banks.

20 Claims, 9 Drawing Sheets

DUAL INLET AND OUTLET EXHAUST GAS RECIRCULATION COOLER FOR TURBOCHARGED ENGINE

FIELD

The present application relates generally to the design and method of operation of a cooler for an exhaust gas recirculation system of a turbocharged internal combustion engine.

SUMMARY/BACKGROUND

Engine systems may utilize recirculation of exhaust gas from an engine exhaust system to an engine intake system, a process referred to as exhaust gas recirculation (EGR), to reduce regulated emissions. For example, a turbocharged engine system may include a high-pressure (HP) EGR system which recirculates exhaust gas from the exhaust manifold upstream of the turbocharger turbine to the intake passage downstream of a turbocharger compressor and upstream of the intake manifold. Accordingly, exhaust gas may be recirculated and combined with the fresh intake air from the turbocharger compressor, resulting in a compressed mixture of fresh intake air and recirculated exhaust gas downstream of the compressor. An EGR valve may be controlled to adjust the amount of recirculated exhaust gas flow and achieve a desired intake air dilution, the desired intake air dilution based on engine operating conditions. The HP exhaust gas routed through the EGR system is measured and adjusted based on engine speed and load during engine operation to maintain desirable combustion stability of the engine while providing emissions and fuel economy benefits.

Many engine systems utilize two banks of cylinders arranged in a V formation, also known as a V-engine. Furthermore, in turbocharged V-engines, two turbochargers may be utilized to compress the intake charge. A common configuration is a parallel twin-turbocharger engine, wherein one turbocharger is assigned to one cylinder bank. Furthermore, the two turbochargers operate individually so the compressed charge of one turbocharger is not fed into the inlet of the second turbocharger. In this type of system, each turbocharger is driven by the exhaust from the exhaust manifolds of their respective cylinder banks. If a HP EGR system is also utilized with a parallel twin-turbocharged engine, then a portion of the exhaust from both cylinder banks are routed through an EGR system. An issue that arises with implementation of a HP EGR system with parallel twin-turbochargers is that systems may experience turbocharger boost imbalance which is a result of unequal exhaust gas conduits. Turbocharger boost imbalance may lead to adverse engine operation.

In one EGR system arrangement, shown by Gladden and Mineart in U.S. Pat. No. 8,297,054, an EGR circuit is connected to two cylinder banks arranged in a v-configuration. The engine system includes two main turbochargers that discharge exhaust in parallel to aftertreatment devices in one embodiment. The EGR circuit contains two inlet ports that are fluidly connected to the two exhaust manifolds corresponding to the first and second cylinder banks. Also, the two inlet ports are fluidly connected to an EGR cooler via a fluid passage. High-pressure exhaust at elevated temperatures from the two exhaust manifolds is routed through the inlets into the fluid passage which sends the exhaust through the EGR cooler. The EGR cooler is shown to have a single inlet passage and a single outlet passage through which the exhaust flows.

However, the inventors herein have identified potential issues with the approach of U.S. Pat. No. 8,297,054. With the progression of more compact vehicles that strive to minimize total weight while maintaining engine power and performance, efficient packaging of the engine has become increasingly important. In many EGR systems, the extra ductwork and components required to maintain equal length tubes to avoid turbo imbalance are expensive to add and difficult to package in the limited engine space.

Thus in one example, the above issues may be addressed by an exhaust gas recirculation (EGR) cooler, comprising: a coolant passage with a coolant inlet positioned on a first longitudinal surface of the cooler, fluidically coupled to an external coolant circuit, and a coolant outlet positioned on a second lateral surface of the cooler, fluidically coupled to an external coolant circuit, the second lateral surface opposite and parallel to the first longitudinal surface; a first exhaust passage with an inlet and an outlet located on opposite lateral surfaces, the lateral surfaces perpendicular to the first and second longitudinal surfaces; and a second exhaust passage equal in length to the first exhaust passage, the second exhaust passage including an inlet and an outlet located on the opposite lateral surfaces, the second exhaust passage inlet on the same surface as the outlet of the first exhaust passage, and the second exhaust passage outlet on the same surface as the inlet of the first exhaust passage. In this way, the dual conduit EGR cooler design enables shorter, equal length EGR gas supply tubes and shortens the overall package space required without causing turbocharger boost imbalance or adversely affecting engine performance For example, each of the exhaust manifolds may be configured with exhaust tubes that direct exhaust gases towards their respective turbines. Upstream of the turbine inlets and downstream of the exhaust manifolds, two supply tubes (one for each cylinder bank) may branch away from the turbines and connect to opposite sides of an EGR cooler. The two supply tubes may enter the EGR cooler and may be routed through the EGR cooler in equal lengths, emerging on opposite sides as discharge tubes. The discharge tubes may then meet to form a combined exhaust conduit that leads away from the EGR cooler to a control valve that adjusts the EGR gas flow into the intake passage and intake manifold of the engine. By using the dual inlet/outlet EGR cooler, EGR gas from both cylinder banks may be equally cooled and merged with the intake charge without adding extra piping.

Furthermore, the EGR cooler may be mounted on a portion of the engine such that the supply tubes for both cylinder banks are symmetrically routed into the EGR cooler. The EGR cooler may be attached perpendicularly to the axis of the crankshaft, reducing the supply piping distance that connects the exhaust passages to the EGR cooler. Additionally, the merged exhaust conduit leading from the EGR cooler to the intake passage may also be reduced in length.

In another example, in order to reduce package space, an engine method is provided, comprising: directing first and second exhaust gases through two separate exhaust passages into first and second opposite sides of an EGR cooler, respectively; directing the still separate first and second exhaust gases out of the EGR cooler through the second and first sides, respectively; and merging the exhaust gases to form a single exhaust conduit outside the EGR cooler. In this way, a portion of the exhaust passages mounted outside the EGR cooler in common engine systems prior to the junction may be integrated within the proposed EGR cooler with two separate exhaust passages. For example, by merging the exhaust gases to form a single exhaust conduit outside and downstream the EGR cooler, it is possible to create a more compact EGR system that may be mounted to the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
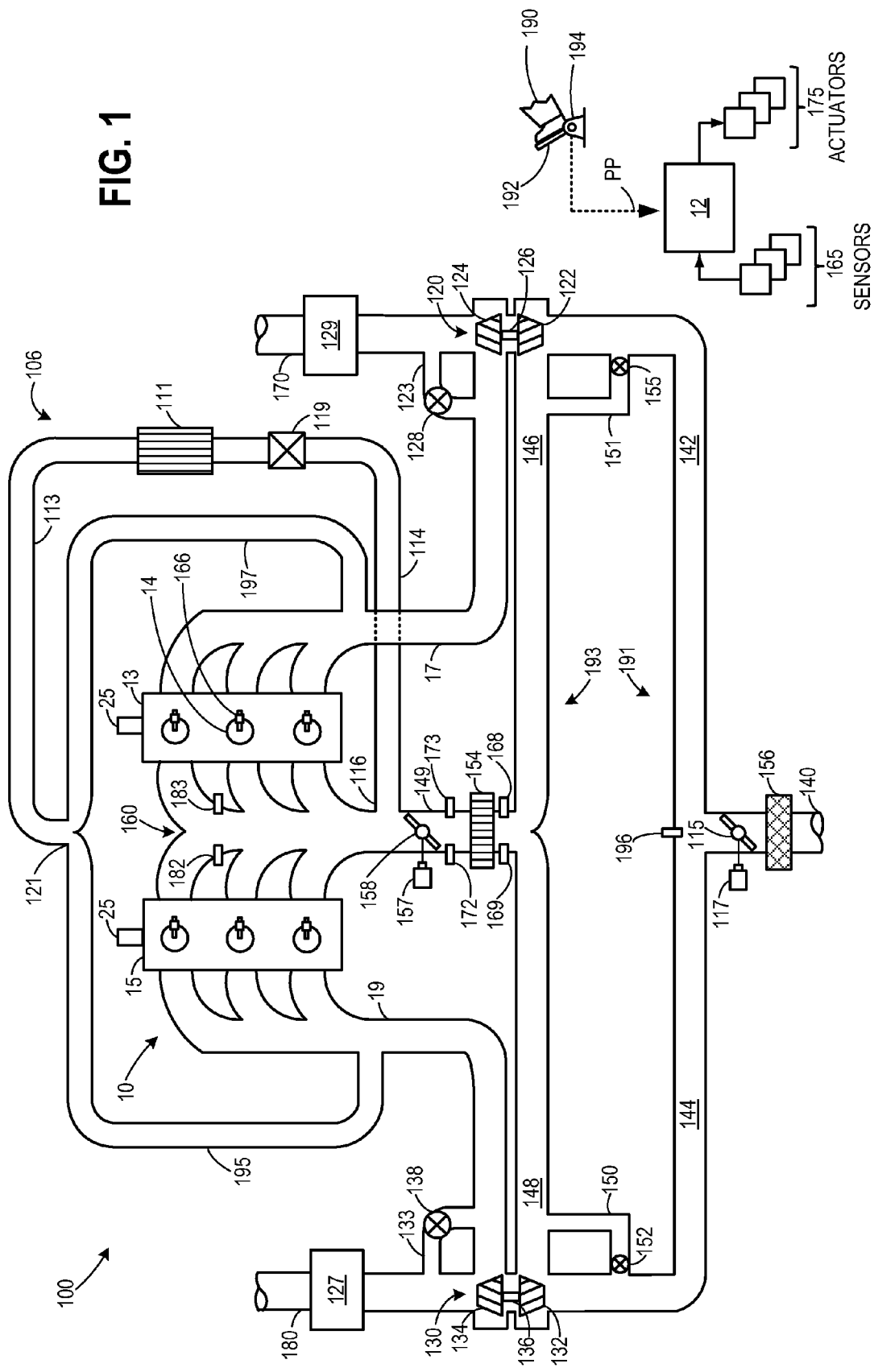
FIG. 1 shows a schematic diagram of a twin-turbocharged engine system including a common high-pressure EGR system.
Figure 4:
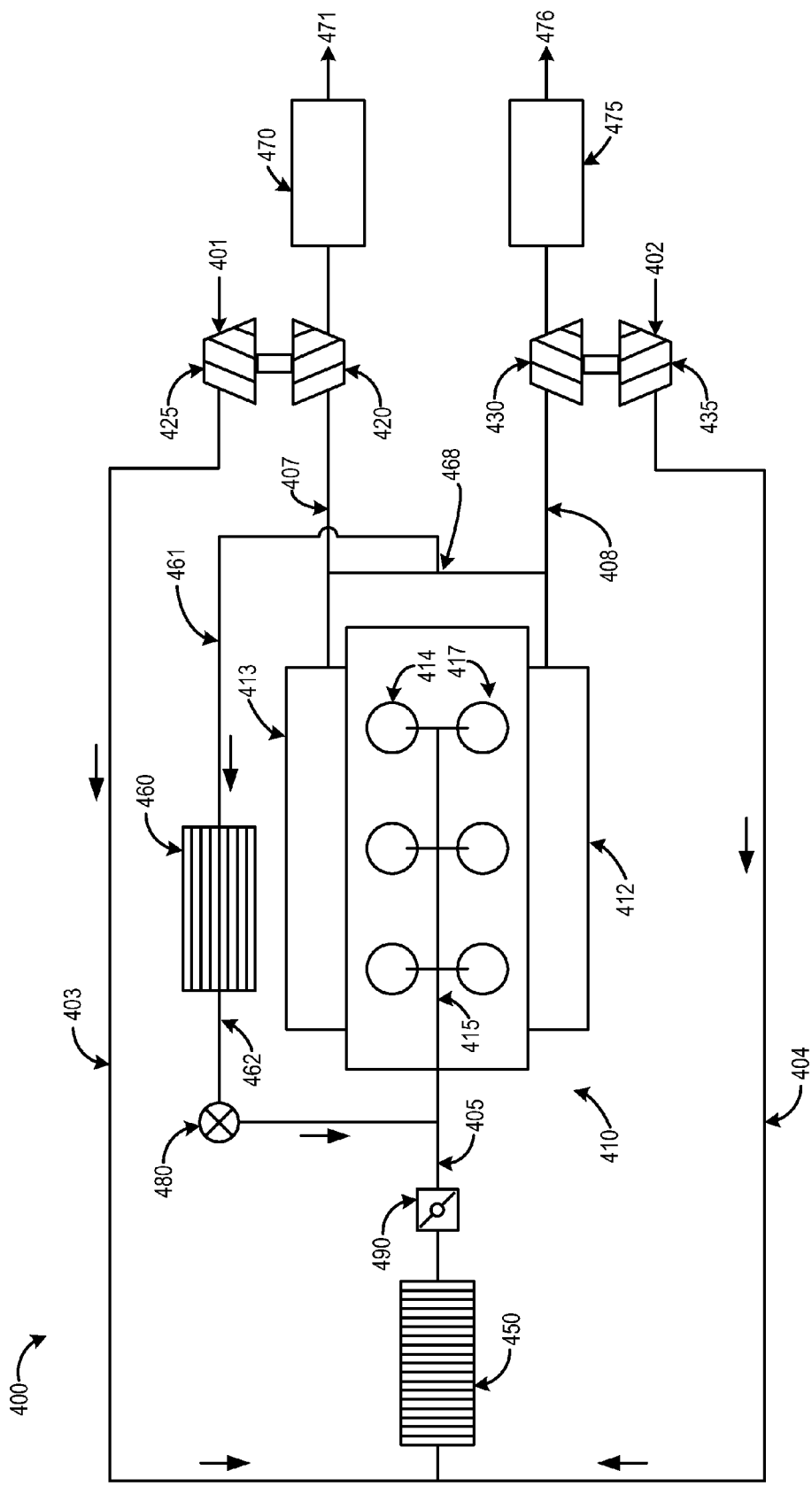
FIG. 4 is a simplified schematic diagram of the twin-turbocharged engine system of FIG. 1 including a common high-pressure EGR system.
Figure 5:
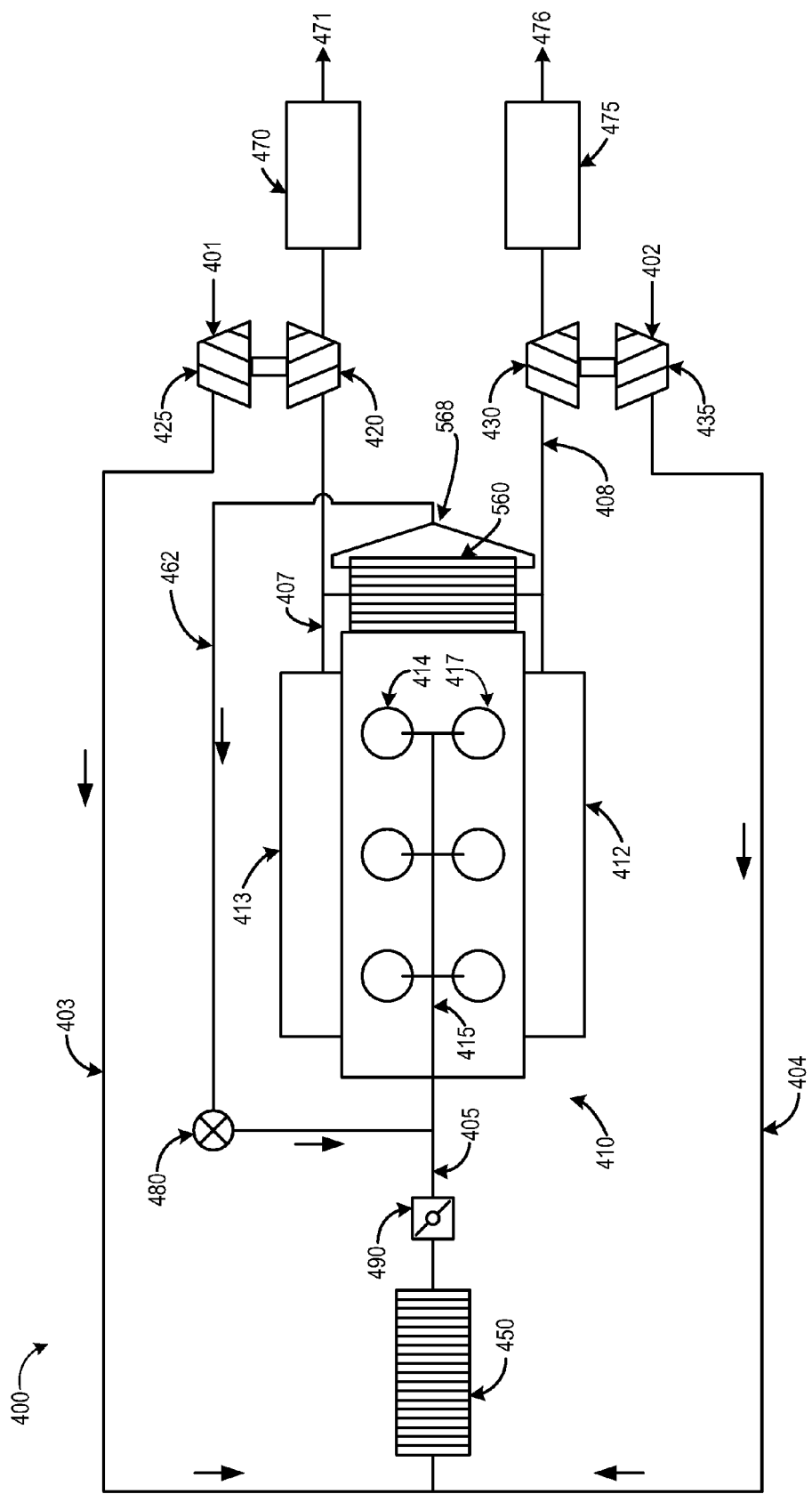
FIG. 5 is a simplified schematic diagram of the twin-turbocharged engine system of FIG. 2 with the modified high-pressure EGR system that includes the dual inlet/outlet EGR cooler.
Figure 7:
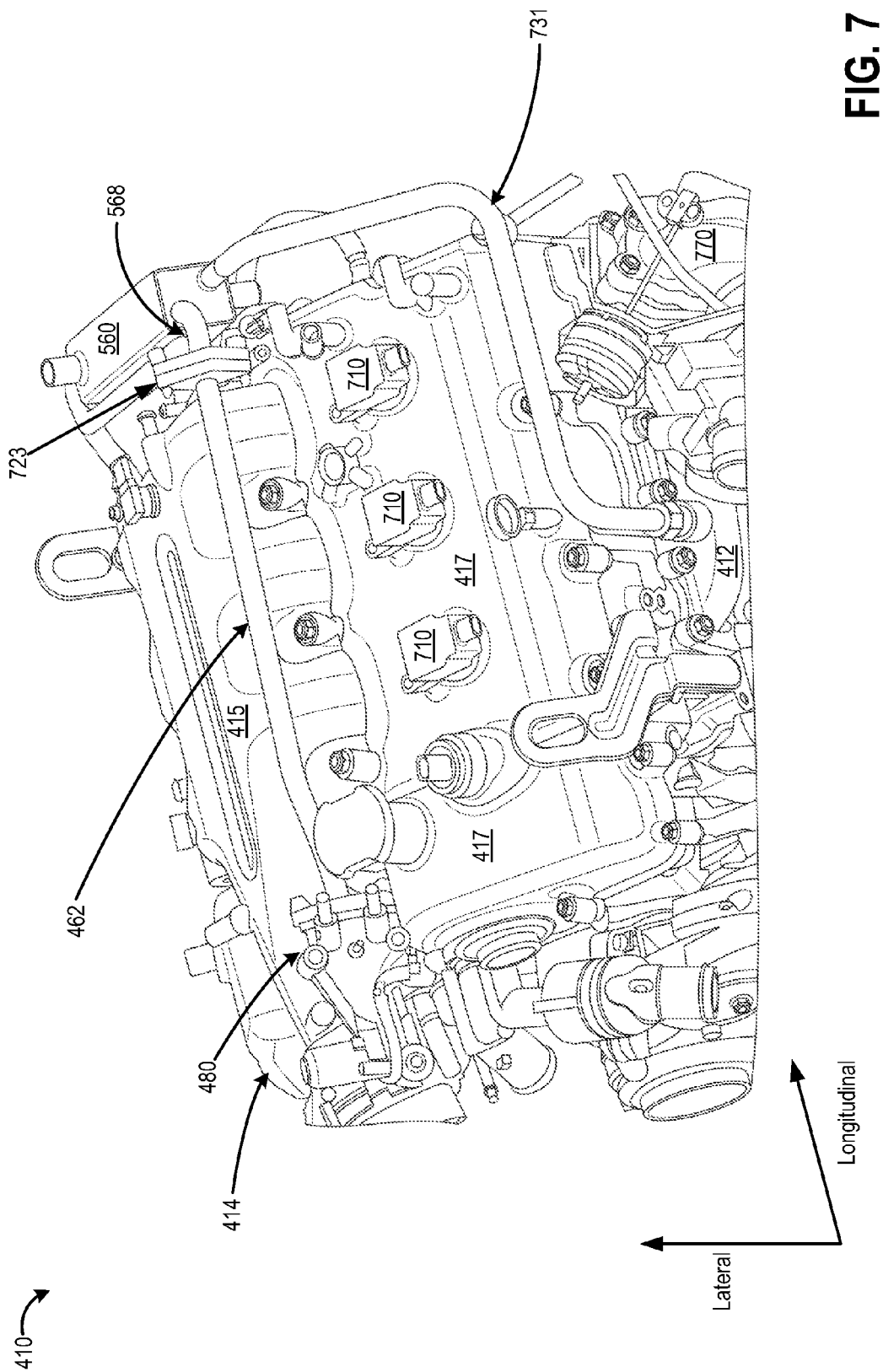
FIG. 7 illustrates an example of mounting the EGR cooler of FIG. 5 to the engine.
Figure 8:
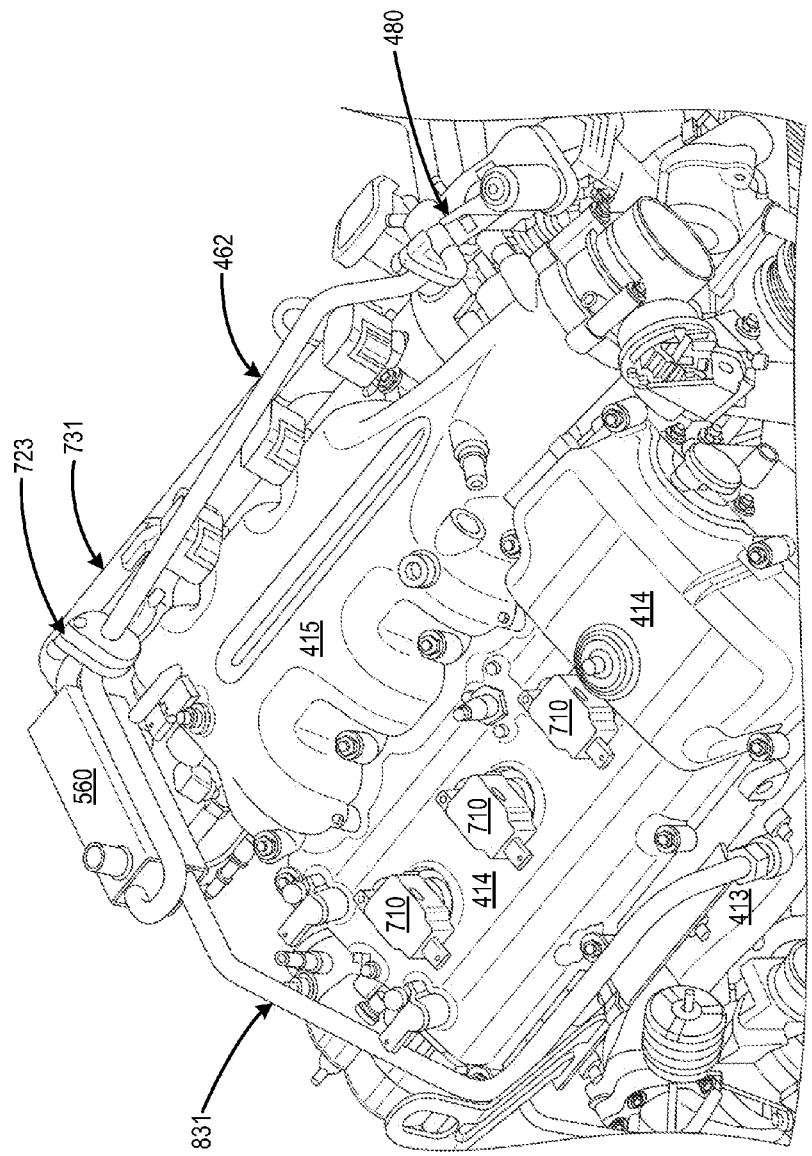
FIG. 8 shows an alternate view of the EGR cooler and engine of FIG. 7.
Figure 9:
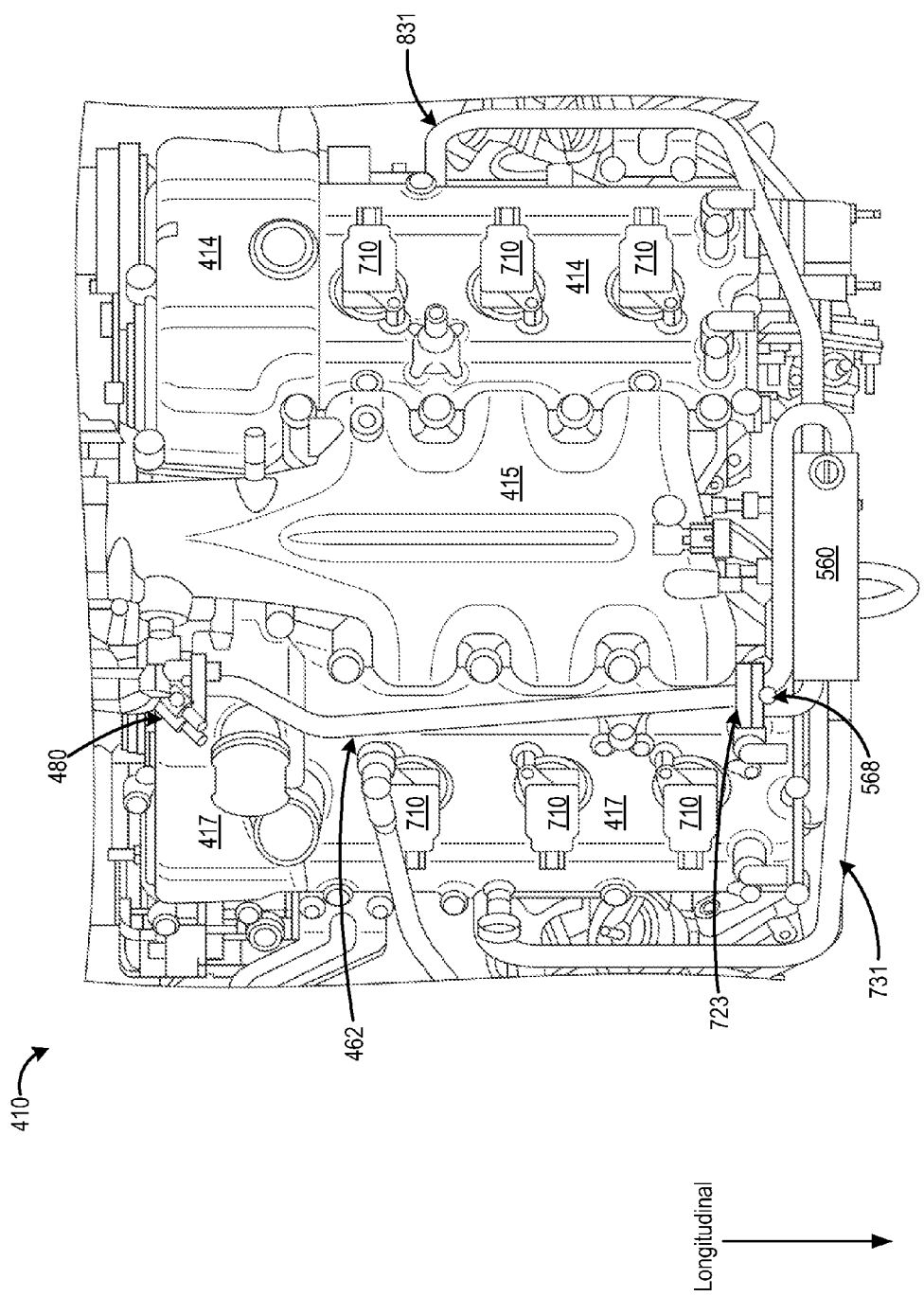
FIG. 9 shows a top view of the EGR cooler and engine of FIG. 7.

The following description provides systems and methods for a high-pressure exhaust gas recirculation (HP EGR) system of a parallel twin-turbocharged internal combustion engine and in particular a cooler for decreasing the temperature of recirculated exhaust gas. A common engine system is shown in FIG. 1 with two turbochargers working in parallel with cylinders arranged in two banks in a V-6 fashion. The engine system includes an HP EGR system that utilizes an EGR cooler with a single inlet and outlet for exhaust gases to pass through one conduit. The same engine system as FIG. 1 is provided in FIG. 2 with the exception of a modified EGR cooler that has two inlets and two outlets to form two exhaust passages within the cooler. The two exhaust passages are separated upstream of and inside the cooler, fluidly coupled to the exhaust manifolds of the two cylinder banks, and merge downstream of the cooler. The modified or dual conduit EGR cooler is described with regard to FIG. 3. FIG. 4 illustrates a simplified engine system to better illustrate the placement of the common single conduit EGR cooler. Similarly, FIG. 5 illustrates a simplified engine system to show the arrangement of the dual conduit EGR cooler and its ductwork. The general operation of the EGR system with the dual conduit EGR cooler is shown in the flow chart of FIG. 6. Finally, FIG. 7 shows how the dual conduit EGR cooler of FIG. 5 is mounted to the engine while FIGS. 8 and 9 show alternate views of the engine and EGR cooler of FIG. 7.

Regarding terminology in the following description, the proposed EGR cooler may be interchangeably referred to as the dual conduit, dual inlet/outlet, or the modified EGR cooler. Also, a parallel twin-turbocharger engine wherein one turbocharger is assigned to a cylinder bank may also be called a dual-turbocharger system as only parallel systems will be referred to herein. As stated previously, a high-pressure exhaust gas recirculation system takes a portion of exhaust upstream of the turbine, cools the gas, and sends the gas to merge with the intake air (charge) downstream of the compressor and upstream of the intake manifold. Exhaust gas that enters an EGR cooler may be referred to as EGR gas or simply as exhaust gas or exhaust.

FIG. 1 shows a schematic depiction of an example turbocharged engine system 100 including a multi-cylinder internal combustion engine 10 and twin turbochargers 120 and 130 in a parallel configuration, which may be identical. As one non-limiting example, engine system 100 can be included as part of a propulsion system for a passenger vehicle. While not depicted herein, other engine configurations may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described below as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. An example control routine that utilizes controller 12 is described herein with regard to FIG. 6.

Engine system 100 may receive intake air via intake passage 140. As shown in FIG. 1, intake passage 140 may include an air filter 156 and an air induction system (AIS) throttle 115. AIS throttle 115 may be configured to adjust and control the amount of HP EGR flow. The position of AIS throttle 115 may be adjusted by the control system via a throttle actuator 117 communicatively coupled to controller 12.

At least a portion of the intake air can be directed to a compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144. Accordingly, engine system 100 includes a low-pressure AIS system 191 upstream of compressors 122 and 132, and a high-pressure AIS system 193 downstream of compressors 122 and 132.

The first portion of the total intake air can be compressed via compressor 122 where it may be supplied to intake manifold 160 via intake air passage 146. Thus, intake passages 142 and 146 form a first branch of the engine's air intake system.

Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes an air cooler 154 and a throttle 158. The position of throttle 158 may be adjusted by the control system via a throttle actuator 157 communicatively coupled to controller 12. As shown, throttle 158 may be arranged in intake passage 149 downstream of air cooler 154, and may be configured to adjust the flow of an intake gas stream entering engine 10.

As shown in FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs), CBVs 152 and 155 may be controlled to enable release of pressure in the intake system when the engine is boosted. An upstream end of CBV passage 150 may be coupled with intake passage 144 upstream of compressor 132, and a downstream end of CBV passage 150 may be coupled with intake passage 148 downstream of compressor 132. Similarly, an upstream end of a CBV passage 151 may be coupled with intake passage 142 upstream of compressor 122, and a downstream end of CBV passage 151 may be coupled with intake passage 146 downstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a LP AIS pressure sensor 196 is arranged at a juncture of intake passages 140, 142, and 144, and an HP AIS pressure sensor 169 is arranged in intake passage 149. However, in other anticipated embodiments, sensors 196 and 169 may be arranged at other locations within the LP AIS and HP AIS, respectively. Among other functions, measurements from LP AIS pressure sensor 196 and HP AIS pressure sensor 169 may be used to determine compressor pressure ratio, which may in factor into an estimate of compressor surge risk.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Products of combustion that are exhausted by engine 10 via exhaust passages 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may receive a pressure difference for facilitating the actuation of wastegate 138 via the actuator from the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 170 downstream of turbine 134, while combustion products exhausted via exhaust passage 19 may be directed to the atmosphere via exhaust passage 180 downstream of turbine 124. Exhaust passages 170 and 180 may include one or more exhaust after-treatment devices, such as a catalyst, and one or more exhaust gas sensors. For example, as shown in FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically reset by operating at least one cylinder of the engine within a particular air/fuel ratio, for example.

Engine system 100 further includes a common high-pressure (HP) EGR system 106. HP EGR system 106 routes a desired portion of exhaust gas from exhaust passage 19 to intake passage 149, and routes a desired portion of exhaust gas from exhaust passage 17 to intake passage 149. In the depicted embodiment, EGR is routed in an EGR passage 195 from upstream of turbine 134 to a junction 121. Similarly, EGR is routed in an EGR passage 197 from upstream of turbine 124 to a junction 121. As shown in FIG. 1, EGR from EGR passages 195 and 197 can be recombined via a common EGR passage 113 before reaching the EGR cooler 111. EGR passages 195 and 197 are of equal length, from where they split from passages 19 and 17 to where they merge at junction 121. The amount of EGR provided to intake passage 149 may be varied by the controller 12 via EGR valve 119 coupled in the HP EGR system 106. In the example embodiment shown in FIG. 1, HP EGR system 106 includes an EGR cooler 111 positioned upstream of EGR valve 119. EGR cooler 111 may reject heat from the recirculated exhaust gas to engine coolant, for example.

EGR valve 119 may be configured to adjust an amount and/or rate of exhaust gas diverted through the corresponding EGR passages to achieve a desired EGR dilution percentage of the intake charge entering the engine, where an intake charge with a higher EGR dilution percentage includes a higher proportion of recirculated exhaust gas to air than an intake charge with a lower EGR dilution percentage. Once the recirculated exhaust gas is discharged from the EGR cooler 111 and passes through the EGR valve 119, the gas is directed through EGR passage 114 to the junction 116. At junction 116, the recirculated exhaust gas and intake charge merge to be sent back into intake manifold 160.

In addition to the position of the EGR valve, it will be appreciated that CBV position, AIS throttle position, and wastegate position may also affect the EGR dilution percentage of the intake charge. For example, there may be a risk of over-dilution of intake air when the CBV changes state (e.g. switches from closed to open, or from partially closed to more open). When the CBV is opened, a mixture of EGR and fresh air may be recirculated back to the intake passage upstream of the compressor, which may increase the EGR dilution percentage if the EGR valve remains open to add further EGR to the intake charge upstream of the compressor. In contrast, while the CBV remains in a fixed position—either open, closed, or partially open—EGR control may not be affected. As another example, AIS throttle position may affect the flow of fresh air into the intake system; more fresh air flow into the intake system may decrease the EGR dilution percentage, whereas less fresh air flow into the intake system may increase the EGR dilution percentage. As yet another example, wastegate position may affect exhaust backpressure; if the EGR valve is not fully closed, exhaust backpressure may affect the EGR flow to the intake system. Accordingly, as will be detailed below, EGR dilution of the intake charge may be controlled via control of one or more of EGR valve position, CBV position, AIS throttle position, and wastegate position, among other parameters.

The EGR dilution percentage of the intake charge at a given time (e.g., the proportion of combusted gases to air in an intake passage of the engine) may be inferred from the output of an intake oxygen sensor 168. In the depicted embodiment, the intake oxygen sensor is positioned at a juncture of intake passages 146, 148, and 149 and upstream of air cooler 154. However, in other embodiments, sensor 168 may be arranged downstream of air cooler 154, or at another location along intake passage 149. Intake oxygen sensor 168 may be any suitable sensor for providing an indication of the oxygen concentration of the intake charge, such as a linear oxygen sensor, intake UEGO (universal or wide-range exhaust gas oxygen) sensor, two-state oxygen sensor, etc. Controller 12 may estimate the percent dilution of the EGR flow based on feedback from intake oxygen sensor 168. In some examples, the controller may then adjust one or more of EGR valve 119, AIS throttle 115, CBV 152, CBV 155, wastegate 138, and wastegate 128 to achieve a desired EGR dilution percentage of the intake charge.

Engine system 100 may include various sensors 165, in addition to those mentioned above. As shown in FIG. 1, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Further, while not depicted herein, each of intake passages 142 and 144 can include a mass air flow sensor.

FIG. 1 shows a general engine system 100 operating with twin-turbochargers in a parallel arrangement and a common HP EGR system 106 wherein the EGR cooler 111 has a single inlet and outlet, connected to EGR passages 113 and 114, respectively. The inventors herein have recognized that the common HP EGR system 106 may be difficult to efficiently package within the limited space available to engines inside compact modern vehicles. Since EGR passages 195 and 197 have equal lengths as a requirement to prevent turbocharger imbalance, it can be seen in FIG. 1 that the extra ductwork of passages 195, 197, 113, and 114 may contribute to additional cost and difficulty in mounting the EGR system 106 on the engine 10.

Figure 2:
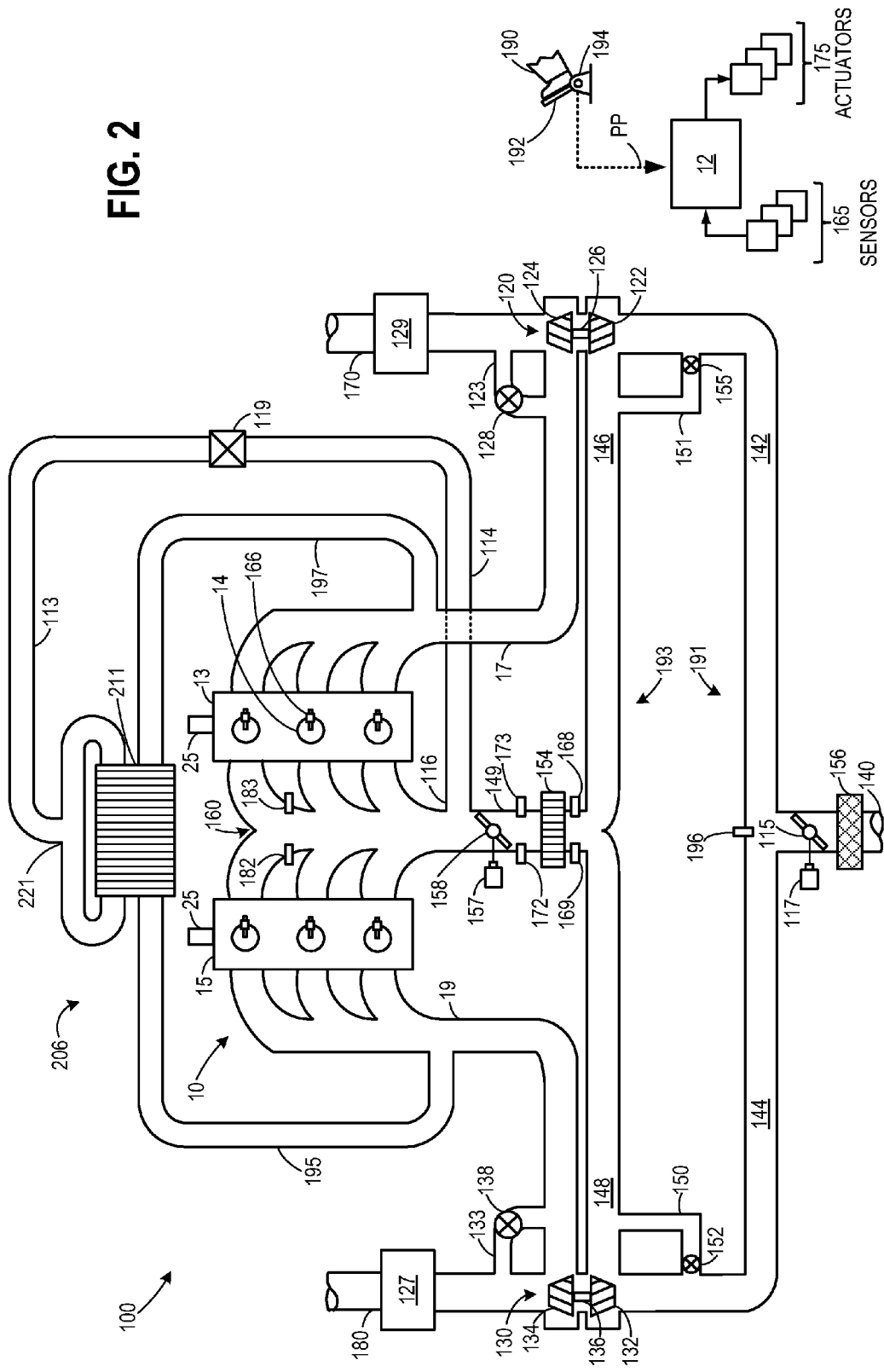
FIG. 2 shows a schematic diagram of the twin-turbocharged engine system of FIG. 1 with a modified high-pressure EGR system that includes a dual inlet/outlet EGR cooler.

A modified EGR cooler 211 can be seen in FIG. 2. Note that the engine system 100 is the same as FIG. 1 with the exception of the EGR cooler 211. As such, the labeling for FIG. 1 and FIG. 2 remains the same since their operation is identical. For brevity, refer to the description of FIG. 1 concerning the operation of engine system 100. As seen in FIG. 2, the modified EGR cooler 211 contains two inlets and two outlets through which EGR gas may flow. Instead of merging the EGR passages 195 and 197 upstream of the EGR cooler as seen in FIG. 1, the EGR system 206 of FIG. 2 merges the passages downstream of the EGR cooler 211 at junction 221.

Coolant may enter the EGR cooler 211 to uniformly decrease the temperature of exhaust gases passing through the individual passages of the modified EGR cooler. In this way, as further explained below, the package space of EGR system 206 is reduced. The modified EGR cooler 211 will hereafter be referred to as dual-conduit EGR cooler.

In another example of current solutions to EGR systems with dual turbochargers, two EGR coolers may be used with one connected to the EGR gas from each of the two cylinder banks. In this system setup, not shown, it is clear that the same problem of packaging space is present due to the added bulk of utilizing two EGR coolers instead of one. Furthermore, the two EGR cooler system may require additional piping than a single EGR cooler system, due to the extra set of piping needed on the outlet side of the EGR cooler leading to the common intake passage.

Figure 3:
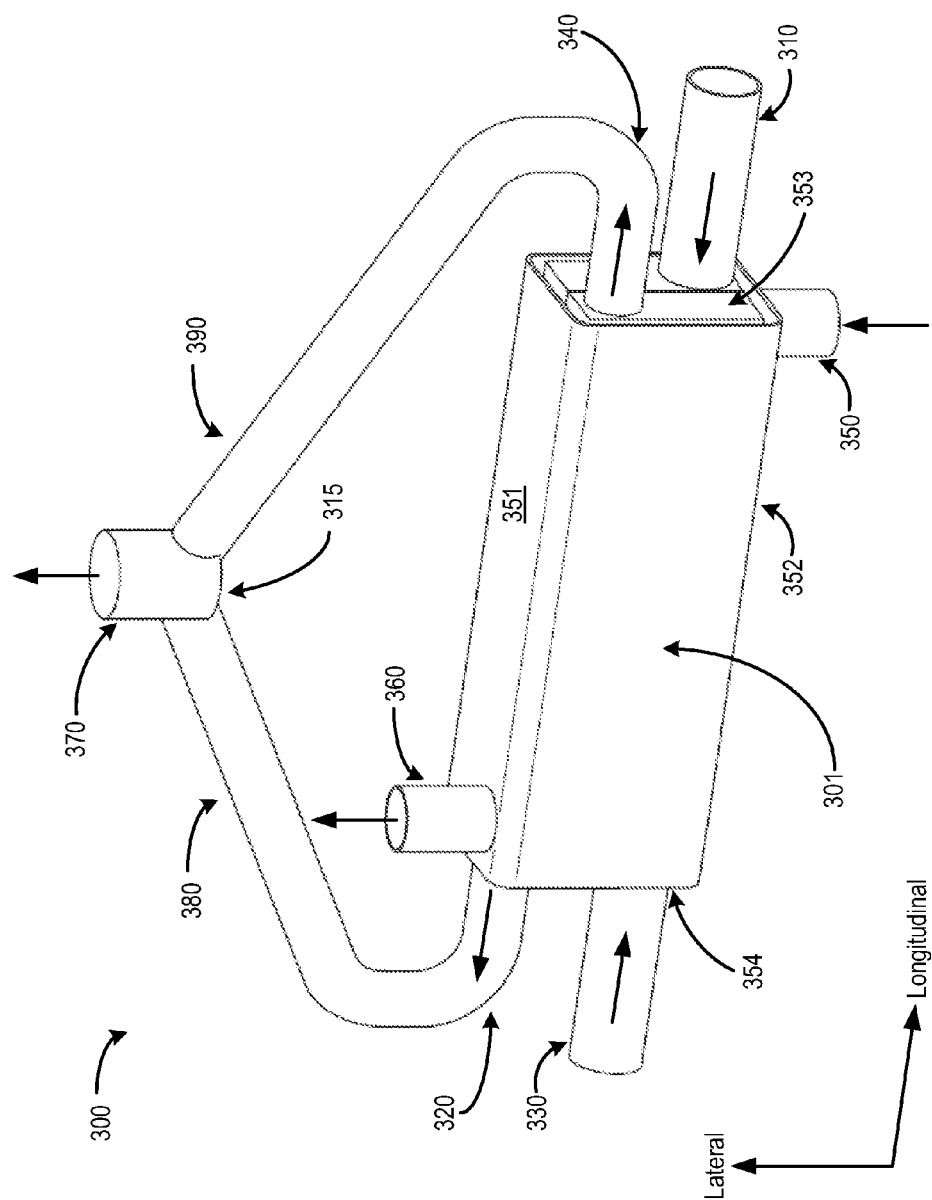
FIG. 3 is a perspective view of the dual inlet/outlet EGR cooler.

FIG. 3 shows an embodiment of the dual-conduit EGR cooler 300, similar to the EGR cooler 211 of FIG. 2. The cooler includes a housing 301 that holds the piping for the EGR gas and coolant. As can be seen in FIG. 3, the cooler housing 301 is longer in the longitudinal direction than it is in the lateral direction. As such, surfaces 351 and 352 are of equal and longer lengths than shorter, equal surfaces 353 and 354. On surface 351 the coolant inlet 350 is positioned near the edge of the housing. On the opposite surface 352 the coolant outlet 360 is positioned near the opposite edge of the housing. The coolant inlet 350 and outlet 360 are connected to a coolant system outside the EGR cooler 300. Note that EGR cooler 300 is a single, unitary EGR cooler contained within housing 301 and connected passages, as further explained below.

The EGR gas from the left (or first) cylinder bank enters the EGR cooler housing 301 through the left bank EGR inlet 310. The inlet 310 is located on surface 353 as seen in FIG. 3. The EGR gas from the left cylinder bank exits the housing 301 on the opposite surface 354 through the left bank EGR outlet 320. It is shown that the inlet and outlet are not collinear but are shifted such that the outlet is above the inlet in the lateral direction.

Similarly, the EGR gas from the right (or second) cylinder bank enters the housing 301 through the right bank EGR inlet 330. The right bank inlet 330 is located on surface 354, with the outlet 320 located above the inlet 330 in the lateral direction. The EGR gas from the right cylinder bank exits the housing 301 on the opposite surface 353 through the right bank EGR outlet 340. Similar to the left bank inlet and outlet, the right bank inlet 330 and outlet 340 are not collinear but are shifted such that the outlet is above the inlet in the lateral direction.

The left bank EGR outlet 320 is connected to a left bank conduit 380 that bends and extends towards the center of the cooler housing 301. Similarly, the right bank EGR outlet 340 is connected to a right bank conduit 390 that bends and extends towards the center of the cooling housing 301 near the left bank conduit 380. The left and right bank conduits 380 and 390 then merge at a junction 315 to form a combined exhaust conduit 370 which leads away from the EGR cooler 300 and connects downstream to the EGR control valve (not shown). Flow directions of exhaust gas and coolant are shown by the unlabeled arrows in FIG. 3.

The cooler housing 301 contains two exhaust passages (not shown) that are fluidically connected to the EGR inlets and outlets 310, 320, 330, 340 that correspond to the left and right cylinder banks, respectively. The two (first and second) exhaust passages are equal in length and are maintained completely separate within the cooler housing 301, only merging at the junction 315 outside the housing.

The cooler housing 301 also contains a third passage (not shown) that fluidically connects the coolant inlet 350 and outlet 360. The third passage remains separated from the two exhaust passages both inside and outside the housing 301. The coolant used to decrease the temperature of the EGR gases flowing through the EGR cooler 300 may be a liquid at a temperature necessary to remove a desired amount of heat from the EGR gases in order to achieve a predetermined engine performance. The coolant decreases the temperature of the exhaust gases flowing through the first and second exhaust passages to a suitable temperature for reentry into an intake manifold of an engine. Additionally, the coolant passage ductwork within the EGR cooler housing 301 may be arranged to provide near-equal cooling to the EGR gases from both the left and right cylinder banks.

The left and right cylinder bank piping that fluidly connects the exhaust manifolds of the cylinder banks to the inlets 310 and 330 is equal. Furthermore, the left and right cylinder bank exhaust piping is equal throughout the EGR cooler 300. Explicitly, the piping from the left bank EGR inlet 310 to the junction 315 is equal in length to the piping from the right bank EGR inlet 330 to the junction 315. The equal length piping is to reduce the chance of turbocharger boost imbalance. In a broader sense, the distance between a point located in the left bank exhaust manifold and a point located where the EGR gas merges with the intake charge is equal to the distance between an equivalent point located in the right bank exhaust manifold and the same merging point, the distance measured in the piping of the EGR system.

FIG. 4 depicts a simplified engine system, similar to the engine system 100 of FIG. 1. The engine system 400 of FIG. 4 includes an EGR system with an EGR cooler 460 having one exhaust passage with one inlet and one outlet. Intake air 401 is drawn into the first (left cylinder bank) compressor 425 and sent through intake conduit 403. Similarly, intake air 402 is drawn into the second (right cylinder bank) compressor 435 and sent through intake conduit 404. Intake air 401 and 402 may lead from the same common air source upstream of compressors 425 and 435. The two intake conduits 403 and 404 merge upstream of the charge air cooler 450, wherein the intake air is cooled to be sent through throttle 490. The cooled intake air is then sent through combined intake conduit 405 and into the intake manifold 415 where it is drawn into the cylinders. The engine 410 contains two banks of cylinders, a left bank 414 and a right bank 417. The exhaust from each cylinder bank is sent into their respective exhaust manifolds; a left exhaust manifold 413 and a right exhaust manifold 412. The exhaust from the left exhaust manifold 413 is sent through a left exhaust conduit 407 and through turbine 420 into an aftertreatment device 470 to be expelled at 471. Similarly, the exhaust from the right exhaust manifold 412 is sent through a right exhaust conduit 408 and through turbine 430 into an aftertreatment device 475 to be expelled at 476.

A portion of the exhaust gas from exhaust conduits 407 and 408 is routed away from turbines 420 and 430 into a junction 468, where the two exhaust gas flows merge into a single inlet conduit 461. The merged exhaust gas then enters EGR cooler 460 where it is cooled and expelled into outlet conduit 462 and through EGR control valve 480. The recirculated exhaust gas is combined with the cooled intake charge in combined intake conduit 405, where the mixture is sent into the intake manifold 415.

The engine system 400 of FIG. 5 is substantially the same as the engine system 400 of FIG. 4 with the exception of the EGR system, in particular the EGR cooler 560 and junction 568. For brevity, no description will be given of the engine system 400 of FIG. 1, and it is noted that the numbering of the same components of FIGS. 4 and 5 is substantially identical. The EGR system of FIG. 5 features the dual-inlet/outlet EGR cooler shown in FIG. 3. The dual conduit EGR cooler 560 is mounted to the side of engine 410 as an example embodiment. As in the system of FIG. 4, a portion of the exhaust gas from conduits 407 and 408 is routed away from turbines 420 and 430. Instead of merging outside the EGR cooler, the separate exhaust passages enter and exit the EGR cooler 560 individually and merge downstream of the EGR cooler at junction 568. In other words, the first (left) exhaust conduit 407 connects the first (left) exhaust manifold 413 to the first (left) inlet of the EGR cooler while the second exhaust conduit 408 connects the second (right) exhaust manifold 412 to the second (right) inlet of the EGR cooler. The cooled EGR gas is then expelled into outlet conduit 462 and through EGR control valve 480 to be mixed with the intake charge in combined intake conduit 405. As can be seen in FIG. 5, the side-by-side arrangement of the inlets and outlets of the EGR cooler 560 allows it to be mounted on the end of the engine 410. This arrangement also shortens the overall package space of the EGR system without affecting performance.

Figure 6:
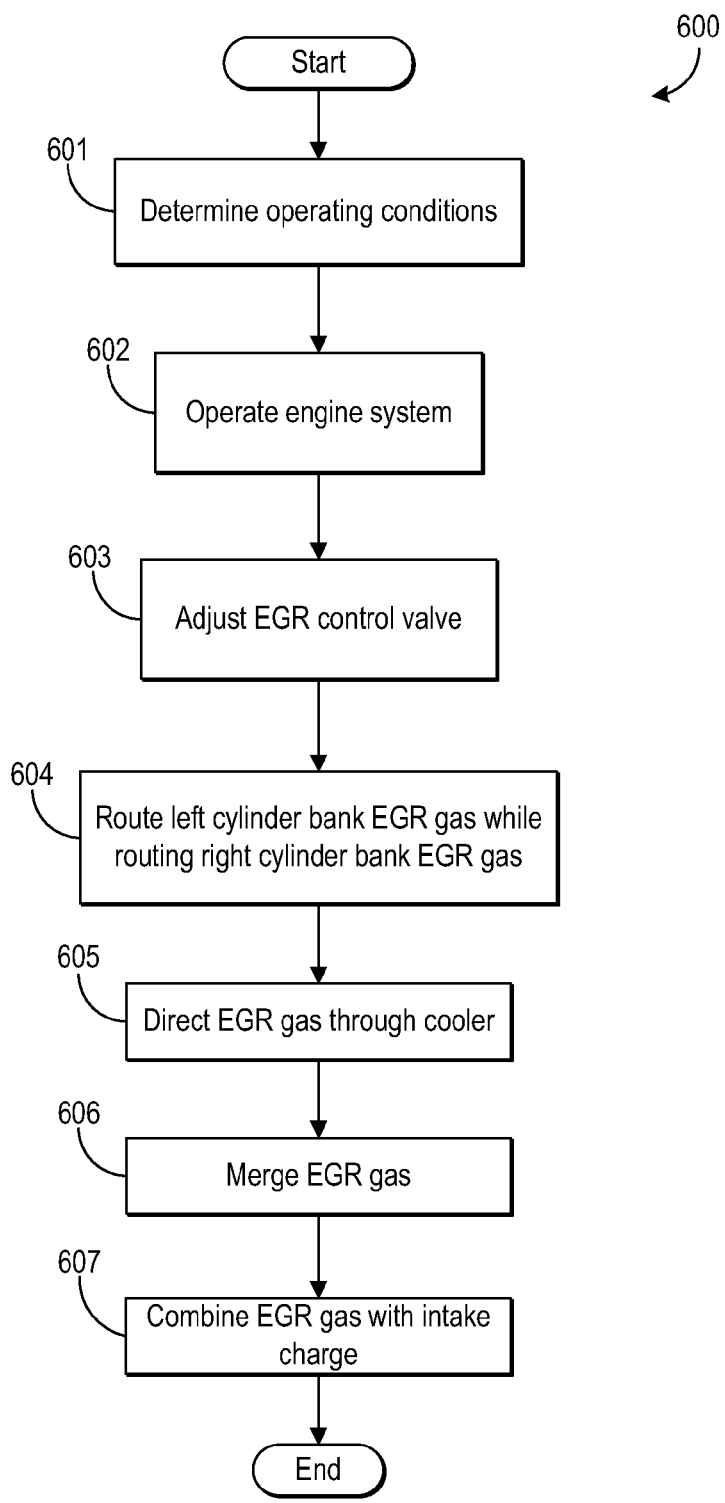
FIG. 6 shows a flow chart for the general operation of the high-pressure EGR system with the dual inlet/outlet EGR cooler.

FIG. 6 illustrates a flow chart for the general operation 600 of the EGR system with the dual-conduit EGR cooler design. The operation 600 begins at 601 by determining a number of engine operating conditions. Engine operating conditions may include, but are not limited to, air fuel ratio, valve positions, and temperature. The engine is then operated at 602 in accordance with a set the desired engine parameters and engine performance, which may be at least in part determined by controller 12 and vehicle operator 190 of FIG. 1. Next, at 603, controller 12 adjusts the position of the EGR control valve to increase or decrease the flow rate of EGR gas to achieve a desired EGR dilution percentage of the intake charge as determined by the desired engine operating condition. At 604, once the EGR valve is adjusted, a portion of the exhaust gas from the left cylinder bank upstream of the left bank turbine is routed away from the exhaust passage into the left bank inlet of the EGR cooler. At the same time, at 604, while exhaust gas is being routed from the left cylinder bank, a portion of the exhaust gas from the right cylinder bank upstream of the right bank turbine is routed away from the exhaust passage into the right bank inlet of the EGR cooler. Left and right cylinder bank exhaust routing as shown at 604 occurs concurrently since exhaust is continuously expelled from both the left and right banks of cylinders.

At 605 the EGR gas is passed through the EGR cooler via the two exhaust passages, thereby decreasing the temperature of the EGR gas to a suitable value for desired engine performance. Upon exiting the EGR cooler, the two individual exhaust passages merge at 606 to form a single combined exhaust conduit that leads away from the EGR cooler. Finally, at 607, upon passing through the EGR control valve downstream of the EGR cooler, the EGR gas is routed back into the intake passage where the EGR gas and intake charge combine to be directed into the intake manifold.

Referring now to FIG. 7, the dual conduit EGR cooler 560 of FIG. 5 is mounted on the end of engine 410 in one possible mounting configuration. A longitudinal axis is defined that lies along the long axis of engine 410 and its crankshaft (not shown). A perpendicular lateral direction is also defined that is vertical if the engine is mounted in a horizontal configuration. Engine 410 shown has six cylinders, each including a spark plug contained in housings 710. Note the shortened length of tubing leading to and from EGR cooler 560. A right bank inlet passage 731 is shown in FIG. 7 that leads from right exhaust manifold 412 to EGR cooler 560. Passage 731 bends and curve according to the curvature of the engine exterior and right cylinder bank 417. Upon merging of exhaust passages at junction 568, a flange 723 is provided that joins the EGR cooler to outlet conduit 462, which in turn leads to EGR control valve 480. The intake manifold 415 is also shown in FIG. 7, which directs intake charge mixed with EGR gas into the engine cylinder banks 414 and 417. A portion of a turbocharger 770 can also be seen in FIG. 7. By being mounted on the end of engine 410, the piping leading to the inlets from both cylinder banks is shorter than similar piping for a single conduit EGR cooler. Due to this, the dual conduit EGR cooler 560 may optimize package space.

FIG. 8 shows the same EGR cooler 560 of FIG. 7 mounted to engine 410 from a different angle. From this view, left cylinder bank 414 is clearly visible along with left exhaust manifold 413. Left bank inlet passage 831 directs a portion of exhaust from left exhaust manifold 413 to EGR cooler 560 on an opposite side than right bank inlet passage 731. Inlet passage 831, similar to passage 731, also bends and curves around the periphery of cylinder bank 414 as it directs exhaust to EGR cooler 560. Identical components to those shown in FIG. 7 are labeled the same in FIG. 8.

FIG. 9 shows EGR cooler 560 of FIG. 7 mounted to engine 410 from a top view perpendicular to the lateral direction. From this view, left cylinder bank 414 and right cylinder bank 417 are visible, along with their respective inlet passages 731 and 831. Note that EGR cooler 560 is mounted such that the longitudinal axis of the cooler as shown in FIG. 3 is perpendicular to the longitudinal axis of the engine 410 in FIG. 9. Identical components to those shown in FIG. 7 are labeled the same in FIG. 9.

From the above descriptions and associated figures, an engine method is provided, comprising: directing exhaust gases from a first set of cylinders to an inlet of a first exhaust passage on a first lateral surface of an EGR cooler; directing exhaust gases from a second set of cylinders to an inlet of a second exhaust passage on a second lateral surface of the EGR cooler, the second lateral surface opposite to the first lateral surface; passing the exhaust gases through the first and second exhaust passages within the EGR cooler adjacent to a coolant passage, the coolant passage including a coolant inlet and outlet located on opposite longitudinal surfaces of the EGR cooler, the longitudinal surfaces perpendicular to the lateral surfaces; exiting the exhaust gases through an outlet of the first exhaust passage on the second lateral surface; exiting the exhaust gases through an outlet of the second exhaust passage on the first lateral surface; and merging the exhaust gases from the first and second exhaust passage outlets to form a single combined exhaust conduit outside the EGR cooler.

By using the dual conduit EGR cooler of FIG. 3 as it is arranged in FIGS. 2, 5 and 7-9, shorter equal length EGR supply tubes may be used which shortens the overall package space required. Furthermore, since the exhaust piping corresponding to the left and right cylinder banks remain equal engine performance will remain substantially unaffected. The compactness of the dual conduit EGR cooler and ductwork may reduce the overall cost of installing a HP EGR system onto an engine. In addition, turbo imbalance is reduced. Overall, the dual conduit EGR cooler may be advantageous over current single conduit EGR coolers.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust gas recirculation (EGR) cooler, comprising:
a coolant passage with a coolant inlet positioned on a first longitudinal surface of the cooler, fluidically coupled to an external coolant circuit, and a coolant outlet positioned on a second lateral surface of the cooler, fluidically coupled to an external coolant circuit, the second lateral surface opposite and parallel to the first longitudinal surface;
a first exhaust passage with an inlet and an outlet located on opposite lateral surfaces, the lateral surfaces perpendicular to the first and second longitudinal surfaces; and
a second exhaust passage equal in length to the first exhaust passage, the second exhaust passage including an inlet and an outlet located on the opposite lateral surfaces, the second exhaust passage inlet on the same surface as the outlet of the first exhaust passage, and the second exhaust passage outlet on the same surface as the inlet of the first exhaust passage.

2. The EGR cooler of claim 1, wherein the EGR cooler is mounted to an engine and the exhaust passage inlets and outlets of the EGR cooler are perpendicular to a crankshaft of the engine.

3. The EGR cooler of claim 1, wherein the first and second exhaust passages merge to form a combined exhaust conduit downstream of the EGR cooler.

4. The EGR cooler of claim 1, wherein the coolant decreases the temperature of the gases flowing through the first and second exhaust passages to a suitable temperature for reentry into an intake manifold of an engine.

5. The EGR cooler of claim 1, wherein the coolant passage provides equal cooling to the gases flowing through the first and second exhaust passages.

6. The EGR cooler of claim 1, wherein the coolant passage, first exhaust passage, and second exhaust passage are contained in a single cooler housing.

7. The EGR cooler of claim 1, wherein the first and second exhaust passages are equal in length from the inlets to a merging junction at which the first and second exhaust passages form the combined exhaust conduit.

8. The EGR cooler of claim 7, wherein the first and second exhaust passages maintain separate exhaust flows throughout the EGR cooler and only combine exhaust flows at the merging junction.

9. An engine method, comprising:
directing first and second exhaust gases through two separate exhaust passages into first and second opposite sides of an EGR cooler, respectively;
directing the still separate first and second exhaust gases out of the EGR cooler through the second and first sides, respectively; and
merging the exhaust gases to form a single exhaust conduit outside the EGR cooler.

10. The engine method of claim 9, wherein the two exhaust passages are maintained completely separated within the EGR cooler from the inlets to the outlets.

11. The engine method of claim 9, wherein the two exhaust passages enter and exit the EGR cooler in opposite directions.

12. The engine method of claim 9, wherein the two exhaust passages are equal in length from a source to a merging junction at which the two exhaust passages form the combined exhaust conduit.

13. The engine method of claim 9, wherein the EGR cooler further includes a coolant passage adjacent to the two exhaust passages.

14. The engine method of claim 13, wherein the coolant passage contains a coolant that decreases the temperature of the exhaust gases flowing through the first and second exhaust passages to a suitable temperature for reentry into an intake manifold of an engine.

15. The engine method of claim 14, wherein the coolant passage provides equal cooling to the exhaust gases flowing through the first and second exhaust passages, the exhaust gases merging downstream of the EGR cooler, the EGR cooler being a single, unitary, EGR cooler.

16. An exhaust gas recirculation (EGR) system, comprising:
two parallel turbochargers;
an EGR cooler coupled downstream of two exhaust manifolds and upstream of an EGR control valve;
a first exhaust conduit connecting the first exhaust manifold to a first inlet of the EGR cooler;
a second exhaust conduit connecting the second exhaust manifold to a second inlet of the EGR cooler, the second inlet located on an opposite surface to the first inlet;
a coolant passage within the EGR cooler with an inlet and outlet located on opposite surfaces, the inlet and outlet fluidically connected to an external cooling system;
two exhaust gas outlets on the EGR cooler located on opposite surfaces; and
a merging junction connecting two conduits leading from the two exhaust gas outlets, the merging junction forming a single combined exhaust conduit that is connected to the EGR control valve.

17. The EGR system of claim 16, wherein the exhaust flows in the first and second exhaust passages enter the EGR cooler in opposite directions.

18. The EGR system of claim 16, wherein the exhaust flows in the first and second exhaust passages exit the EGR cooler in opposite directions.

19. The EGR system of claim 16, wherein the coolant inlet and outlet are on different surfaces of the EGR cooler than the inlets and outlets of the first and second exhaust passages.

20. The EGR system of claim 16, wherein the coolant passage, first exhaust passage, and second exhaust passage are contained in a single cooler housing.

* * * * *